(12) United States Patent
Lin

(10) Patent No.: US 7,037,587 B2
(45) Date of Patent: May 2, 2006

(54) COATED ARTICLES WITH NITRIDED LAYER AND METHODS OF MAKING SAME

(75) Inventor: Yuping Lin, West Bloomfield, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/775,343

(22) Filed: Feb. 11, 2004

(65) Prior Publication Data

US 2004/0214014 A1    Oct. 28, 2004

Related U.S. Application Data

(60) Provisional application No. 60/446,992, filed on Feb. 13, 2003.

(51) Int. Cl.
*B32B 9/00* (2006.01)

(52) U.S. Cl. .............. 428/426; 428/428; 428/432; 428/697; 428/698; 428/699; 428/704

(58) Field of Classification Search ................ 428/426, 428/428, 432, 697, 698, 699, 704
See application file for complete search history.

(56) References Cited

U.S. PATENT DOCUMENTS

| | | | |
|---|---|---|---|
| 4,900,633 A | 2/1990 | Gillery | |
| 5,132,161 A * | 7/1992 | Shibata et al. | .............. 428/432 |
| 5,298,048 A | 3/1994 | Lingle et al. | |
| 5,344,718 A | 9/1994 | Hartig et al. | |
| 5,425,861 A | 6/1995 | Hartig et al. | |
| 5,543,229 A | 8/1996 | Ohsaki et al. | |
| 5,688,585 A | 11/1997 | Lingle et al. | |
| 5,709,930 A | 1/1998 | DePauw | |
| 5,935,702 A | 8/1999 | Macquart et al. | |
| 6,313,577 B1 * | 11/2001 | Kunisada et al. | ........... 313/479 |
| 6,524,714 B1 | 2/2003 | Neuman et al. | |
| 6,582,809 B1 | 6/2003 | Boire et al. | |
| 6,605,358 B1 | 8/2003 | Stachowiak | |
| 2002/0037421 A1 | 3/2002 | Arnaud et al. | |
| 2002/0192473 A1 | 12/2002 | Gentilhomme et al. | |

FOREIGN PATENT DOCUMENTS

| | | |
|---|---|---|
| JP | 62-39056 | 2/1987 |
| JP | 62-157846 | 6/1987 |

OTHER PUBLICATIONS

U.S. Provisional Application No. 60,446/992 filed Feb. 13, 2003.
"High-Temperature Oxidation Behaviors of the $(Ti_{1-x}Cr_x)N$ Coatings", Lee et al., Journal of Materials Science Letters 21, 2002, pp. 423-425.

* cited by examiner

*Primary Examiner*—Jennifer McNeil
*Assistant Examiner*—G. Blackwell
(74) *Attorney, Agent, or Firm*—Nixon& Vanderhye P.C.

(57) ABSTRACT

A coated article is provided with a coating or layer system that includes at least one layer including a nitride of chromium titanium. One, two or more dielectric layers may also be provided in the coating in certain example embodiments. In certain example embodiments, the coating or layer system has good corrosion resistance, good mechanical performance such as scratch resistance, and/or good color stability upon heat treatment.

21 Claims, 1 Drawing Sheet

COATED ARTICLES WITH NITRIDED LAYER AND METHODS OF MAKING SAME

Figure 1:
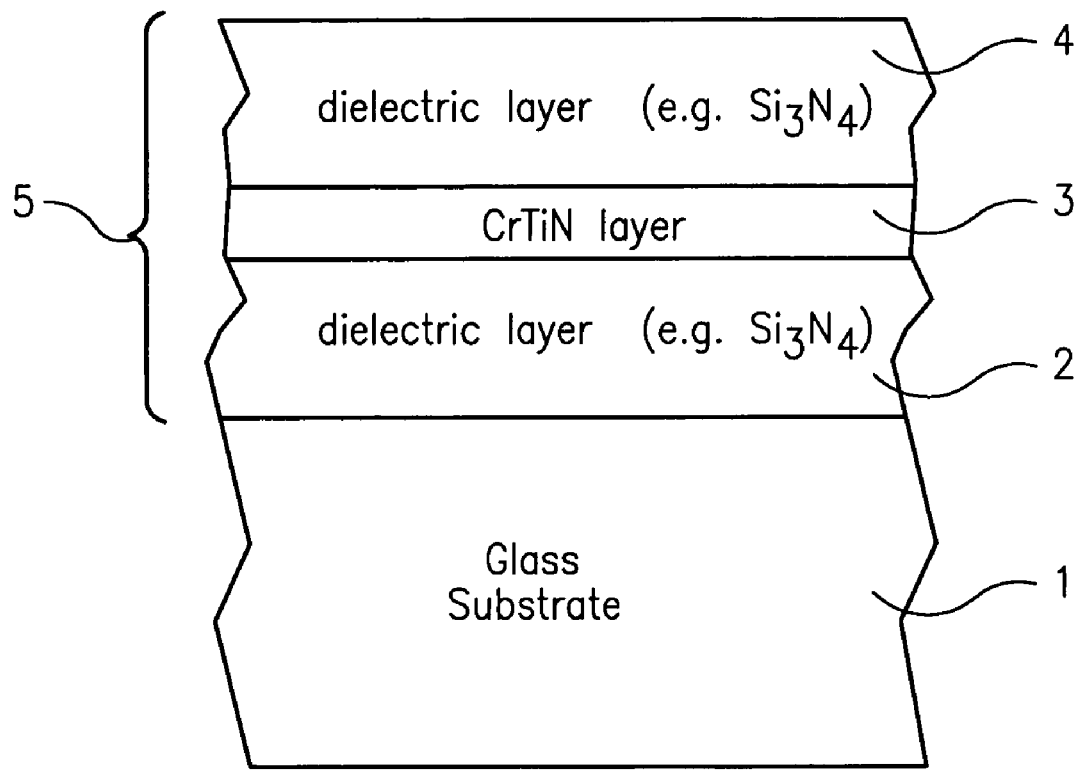

This application claims priority on U.S. Provisional Patent Application No. 60/446,992, filed Feb. 13, 2003, the entire disclosure of which is hereby incorporated herein by reference.

This invention relates to coated articles that include at least one nitride inclusive solar control layer sandwiched between at least a pair of dielectric layers. In certain example embodiments, the nitride inclusive layer may comprise chromium titanium nitride ($CrTiN_x$), and/or any other suitable nitride. Such coated articles may be used in insulating glass (IG) window units, monolithic window units, vehicle windows, and/or other suitable applications.

BACKGROUND OF THE INVENTION

Solar control coatings having a layer stack of glass/$Si_3N_4$/NiCr/$Si_3N_4$ are known in the art. Unfortunately, while such layer stacks provide efficient solar control and are overall good coatings, they sometimes are lacking in terms of: (a) corrosion resistance to acid (e.g., HCl boil); (b) mechanical performance such as scratch resistance; and/or (c) thermal stability upon heat treatment for tempering, heat bending, or the like (i.e., $\Delta E^*$ value(s)).

With respect to such coatings having a layer stack of glass/$Si_3N_4$/NiCr/$Si_3N_4$, such coatings often do not provide sufficient corrosion resistance to solutions such as acid solutions, especially in monolithic applications. Moreover, the NiCr can become a getter for nitrogen atoms in the neighboring silicon nitride layer(s) during heat treatment (HT), so that diffusion of nitrogen and/or nickel (Ni) can create significant color shifts upon HT. While the use of NiCrN may be used to reduce color shift upon HT, Ni diffusion still occurs upon HT thereby causing chemical and/or thermal instability.

Solar control layers of NbN, ZrN or TiN are known in the art (e.g., see U.S. 2002/0192473 or JP 63-206333). Unfortunately, such metal nitrides have limitations such as reduced deposition rates compared to their respective metallic counterparts. Moreover, they tend to have higher resistivity than their bulk data because of deviation from optimal stoichiometry, and/or high porosity and significant grain-boundary impurities associated with possible columnar growth mode. Moreover, nitrides such as TiN and ZrN tend to have strong golden color which makes color tuning difficult.

Accordingly, there exists a need in the art for a coated article that has improved characteristics with respect to (a) corrosion resistance to acid(s), (b) mechanical durability, (c) thermal stability upon HT, (d) reasonably neutral color, and/or (e) deposition rate, but which still is capable of acceptable solar control (e.g., blocking a reasonable amount of IR and/or UV radiation). It is a purpose of this invention to fulfill at least one of the above-listed needs, and/or other needs which will become apparent to the skilled artisan once given the following disclosure.

SUMMARY OF THE INVENTION

In certain example embodiments of this invention, a coating or layer system is provided which includes at least one layer comprising a nitride sandwiched between at least a pair of dielectric layers. The layer comprising the nitride may comprise chromium titanium nitride ($CrTiN_x$) in certain example embodiments of this invention. In certain example embodiments, the coating or layer system has good corrosion resistance to acid(s) such as HCl, good mechanical performance such as scratch resistance, good color stability (i.e., a low $\Delta E^*$ value(s)) upon heat treatment (HT), reasonably neutral coloration, and/or a reasonable solar control layer deposition rate.

Generally speaking, certain example embodiments of this invention fulfill one or more of the above listed objects and/or needs by providing coated article including a layer system supported by a glass substrate, the layer system comprising: a first dielectric layer; a layer comprising chromium titanium nitride provided on the glass substrate over the first dielectric layer; and a second dielectric layer provided on the glass substrate over the layer comprising chromium titanium nitride. At least one of the first and second dielectric layers may comprise silicon nitride in certain example embodiments of this invention. The coated article may or may not be heat treated in different instances.

IN THE DRAWINGS

FIG. 1 is a partial cross sectional view of an embodiment of a coated article (heat treated or not heat treated) according to an example embodiment of this invention.

DETAILED DESCRIPTION OF CERTAIN EXAMPLE EMBODIMENTS OF THE INVENTION

Certain embodiments of this invention provide a coating or layer system that may be used in windows such as monolithic windows, IG units, vehicle windows (windshields, backlites, and/or side windows), architectural windows (commercial or residential), mirrors, and/or other suitable applications. Certain example embodiments of this invention provide a layer system that is characterized by good (a) corrosion resistance to acid (e.g., which can be tested via an HCl boil); (b) mechanical performance such as scratch resistance; (c) thermal stability upon heat treatment; (d) reasonably neutral coloration, and/or (e) a reasonable solar control layer deposition rate.

With respect to thermal stability upon heat treatment (HT), this means a low value of $\Delta E^*$ and/or a low value of $\Delta a^*$; where $\Delta$ is indicative of change in view of HT such as thermal tempering, heat bending, or thermal heat strengthening, monolithically and/or in the context of dual pane environments such as IG units or windshields. Such heat treatments sometimes necessitate heating the coated substrate to temperatures from about 580° C. up to about 800° C. for 5 minutes or more.

FIG. 1 is a side cross sectional view of a coated article according to an example embodiment of this invention. The coated article includes at least substrate 1 (e.g., clear, green, bronze, grey, blue, or blue-green glass substrate from about 1.0 to 12.0 mm thick), first dielectric layer 2 (e.g., of or including silicon nitride (e.g., $Si_3N_4$), silicon oxynitride, a metal oxide, or the like), IR reflecting layer 3 of or including a nitride such as chromium titanium nitride ($CrTiN_x$), and second dielectric layer 4 (e.g., of or including silicon nitride (e.g., $Si_3N_4$), silicon oxynitride, a metal oxide, or the like). The overall coating includes at least layers 2–4. It is noted that the terms "oxide" and "nitride" as used herein include various stoichiometries, including stoichiometric and non-stoichiometric variations. As an example, the term silicon nitride includes stoichiometric $Si_3N_4$ as well as other non-stoichiometric nitrides of silicon. Layers 2–4 may be deposited on substrate 1 via magnetron sputtering, or via any other suitable technique in different embodiments of this invention.

In certain example embodiments of this invention, the metal aspect of $CrTiN_x$ layer 3 may comprise from about 20–70% Ti (more preferably from about 25–55% Ti, and most preferably from about 30–50% Ti)—with the rest of the metal aspect of the layer 3 being made up of Cr or the like. Thus, in certain example embodiments of this invention, the metal aspect of $CrTiN_x$ layer 3 may comprise from about 50–70% Cr. Accordingly, in certain example embodiments of this invention, the Cr/Ti ratio in layer 3 may be from about 0.7 to 4.0, more preferably from about 1.0 to 2.75, and most preferably from about 1.0 to 2.4 in certain example embodiments of this invention. In one example embodiment, the layer may be characterized as Ti(30%)Cr(70%)Nx.

Surprisingly, it has been found that the aforesaid ratio of Ti to Cr provides unexpectedly advantageous results. In particular, if the layer 3 is too Ti-rich, weakness may be realized with respect to deposition rate, color, and chemical/HT durability. On the other hand, if the layer 3 is too Cr-rich, weakness may be realized with respect to dramatic variation of optical constant (n & k), adhesion or stress with certain nitrogen concentrations. Thus, it has surprisingly been found that the best results are achievable with a Ti/Cr ratio in layer 3 of from about 0.7 to 3.0, more preferably from about 1.0 to 2.5, and most preferably from about 1.0 to 2.33 in certain example embodiments of this invention. In certain example embodiments, the crystal structure of $CrTiN_x$ layer 3 may be similar to that of TiN, with the lattice spacing shifting towards CrN, thereby demonstrating a mixing effect of the atoms with different sizes.

Thus, it can be seen that the use of $CrTiN_x$ in layer 3 in certain example embodiments of this invention provides for (a) good corrosion resistance to acid (e.g., which can be tested via an HCl boil); (b) good mechanical performance such as scratch resistance; (c) good thermal stability upon heat treatment; (d) reasonably neutral coloration, and/or (e) a rather high deposition rate.

In certain example embodiments of this invention, $CrTiN_x$ layer 3 may be deposited by sputtering Ti and Cr targets mounted on magnetron sources installed at an angle to the substrate holder in a nitrogen inclusive atmosphere (e.g., at 4.5 mTorr with 20–30% nitrogen partial pressure). During such co-deposition in certain example instances, one side of the substrate may get higher flux of Ti while the other side gets a higher flux of Cr. The mixture of incoming species creates a composition gradient across the substrate. Different nitrogen and argon flows can be introduced to create a nitrogen partial pressure for a desired nitride stoichiometry. A gate valve in the pump line may be used to control the chamber pressure during the deposition for process consistency in certain example embodiments of this invention.

In certain example embodiments of this invention, layer 3 may have a hardness of at least 10 GPa, more preferably of at least 15 GPa, and most preferably at least 20 GPa.

While FIG. 1 illustrates coating 5 in a manner where $CrTiN_x$ layer 3 is in direct contact with dielectric layers 2 and 4, the instant invention is not so limited. Other layer(s) may be provided between layers 2 and 3 (and/or between layers 3 and 4) in certain other embodiments of this invention. Moreover, other layer(s) may be provided between substrate 1 and layer 2 in certain embodiments of this invention; and/or other layer(s) may be provided on substrate 1 over layer 4 in certain embodiments of this invention. Thus, while the coating 5 or layers thereof is/are "on" or "supported by" substrate 1 (directly or indirectly), other layer(s) may be provided therebetween. Thus, for example, the layer system 5 and layers thereof shown in FIG. 1 are considered "on" the substrate 1 even when other layer(s) may be provided therebetween (i.e., the terms "on" and "supported by" as used herein are not limited to directly contacting).

In certain example embodiments of this invention, dielectric anti-reflection layers 2 and/or 4 each may be substantially transparent to visible light and have an index of refraction less than that of metal nitride inclusive layer 3 for anti-reflective purposes (e.g., layers 2 and/or 4 may have an index of refraction "n" of from about 1.9 to 2.1, while layer 3 may have an index "n" higher than that). In embodiments of this invention where layers 2 and/or 4 comprise silicon nitride (e.g., $Si_3N_4$), sputtering targets including Si employed to form these layers may or may not be admixed with up to 6–20% by weight aluminum or stainless steel (e.g. SS#316), with about this amount then appearing in the layers so formed.

In certain example embodiments of this invention, the coated article of FIG. 1 may be used in monolithic applications such as certain window applications. However, in other example embodiments of this invention, the coated article of FIG. 1 may be utilized on surface #2 (or surface #3) of an IG (insulating glass) window unit that includes two glass substrates (e.g., float glass 2 mm to 12 mm thick) that are sealed at their peripheral edges by a conventional sealant and/or spacer (not shown) and may be provided with a conventional desiccant strip (not shown).

Turning back to FIG. 1, while various thicknesses may be used consistent with one or more of the objects and/or needs discussed herein. According to certain non-limiting example embodiments of this invention, example thicknesses and materials for the respective layers on the glass substrate 1 are as follows:

TABLE 1

(Thicknesses)

| Layer | Preferred Range (Å) | More Preferred (Å) |
|---|---|---|
| silicon nitride (layer 2) | 100–900Å | 200–800Å |
| $CrTiN_x$ (layer 3) | 50–900Å | 100–500Å |
| silicon nitride (layer 4) | 100–900Å | 150–800Å |

In certain example non-limiting embodiments of this invention, coatings or layer systems herein provided on clear monolithic glass substrates have reflective color as follows before heat treatment, as viewed from the glass side of the coated article (Ill. C., 2 degree observer):

TABLE 2

Glass Side Reflective Color ($R_G$) Before Heat Treatment

| | General | Preferred |
|---|---|---|
| a* | −8 to +8 | −5 to +6 |
| b* | −30 to +20 | −20 to +10 |
| L* | 10 to 75 | 25 to 60 |

After heat treatment (HT), in certain example embodiments of this invention coated articles have color characteristics as follows in Table 3. It is noted that subscript "G" stands for glass side reflective color, subscript "T" stands for transmissive color, and subscript "F" stands for film side color. As is known in the art, glass side (G) means reflective color when viewed from the glass side (as opposed to the layer/film side) of the coated article. Film side (F) means reflective color when viewed from the side of the coated article on which the coating 5 is provided.

Certain coated articles herein are both chemically and mechanically durable in certain example embodiments of this invention.

TABLE 3

| | Color due to/after Heat Treatment | | |
|---|---|---|---|
| | General | Preferred | Most Preferred |
| $\Delta E^*_G$ | <=5.0 | n/a | n/a |
| $a^*_G$ | −6 to +6 | −4 to +4 | −3 to +3 |
| $b^*_G$ | −30 to +25 | −25 to +20 | −20 to +15 |
| $T_{vis}$ (TY): | 8–80% | 10–40% | 10–30% |
| $R_s$ (Ω/sq): | <220 | <150 | <115 |

Certain terms are prevalently used in the glass coating art, particularly when defining the properties and solar management characteristics of coated glass. Such terms are used herein in accordance with their well known meaning. For example, as used herein:

"Chemical durability" or "chemically durable" is used herein synonymously with the term of art "chemically resistant" or "chemical stability". For example, chemical durability may be determined by boiling a sample of a coated glass substrate in about 500 cc of 5% HCl for one hour (i.e. at about 195° F.). This is what is meant by HCl boil herein. Alternatively, chemical durability may be determined by an NaOH boil which includes boiling a sample of a coated glass substrate in a solution having a pH of about 12.2 that is a mixture of water and NaOH (about 0.4% NaOH); the solution is available from LabChem, Inc., Cat. No. LC 24270-4 (this is what is meant by NaOH boil herein). The NaOH boil may be carried out at a temperature of about 145 degrees F. (Examples above), or about 195 degrees F. in other instances.

The terms "heat treatment" and "heat treating" as used herein mean heating the article to a temperature sufficient to enabling thermal tempering, bending, or heat strengthening of the glass inclusive article. This definition includes, for example, heating a coated article to a temperature of at least about 580 degrees C. for a sufficient period to enable tempering. In some instances, the HT may be for at least about 4 or 5 minutes.

Once given the above disclosure many other features, modifications and improvements will become apparent to the skilled artisan.

What is claimed is:

1. A coated article including a layer system supported by a glass substrate, the layer system comprising:
    a first layer comprising silicon nitride;
    a layer comprising chromium titanium nitride provided on the glass substrate over the first layer comprising silicon nitride;
    a second layer comprising silicon nitride provided on the glass substrate over the layer comprising chromium titanium nitride; and
    wherein the layer comprising chromium titanium nitride is characterized by a Cr/Ti ratio of from about 0.7 to 4.0.

2. The coated article of claim 1, wherein the layer comprising chromium titanium nitride is in direct contact with each of the first and second layers comprising silicon nitride.

3. The coated article of claim 1, wherein at least one of the layers comprising silicon nitride further includes at least one of stainless steel, aluminum, and/or oxygen.

4. The coated article of claim 1, wherein the coated article is not heat treated.

5. The coated article of claim 1, wherein the coated article is heat treated and has a $\Delta E^*_G$ (glass side reflective) value of no greater than 5.0 due to heat treatment, wherein the heat treatment is for at least about 5 minutes at a temperature(s) of at least about 580 degrees C.

6. The coated article of claim 1, wherein the coated article is a window.

7. The coated article of claim 1, wherein the layer comprising chromium titanium nitride is characterized by a Cr/Ti ratio of from about 1.0 to 2.75.

8. The coated article of claim 1, wherein the layer comprising chromium titanium nitride is characterized by a Cr/Ti ratio of from about 1.0 to 2.4.

9. The coated article of claim 1, wherein the coated article is chemically durable.

10. The coated article of claim 1, wherein the coated article has a visible transmission of from about 10–40%.

11. The coated article of claim 1, wherein the layer system consists essentially of the first and second layers and the layer comprising chromium titanium nitride.

12. The coated article of claim 1, wherein the coated article is heat treated.

13. A coated article including a layer system supported by a glass substrate, the layer system comprising:
    a first dielectric layer;
    a layer comprising chromium titanium nitride provided on the glass substrate over the first dielectric layer;
    a second dielectric layer provided on the glass substrate over the layer comprising chromium titanium nitride; and
    wherein the layer comprising chromium titanium nitride is characterized by a Cr/Ti ratio of from about 0.7 to 4.0.

14. The coated article of claim 13, wherein at least one of the first and second dielectric layers comprises silicon nitride.

15. The coated article of claim 13, wherein the layer comprising chromium titanium nitride is in direct contact with each of the first and second dielectric layers.

16. The coated article of claim 13, wherein the coated article is heat treated and has a $\Delta E^*_G$ (glass side reflective) value of no greater than 5.0 due to heat treatment.

17. The coated article of claim 13, wherein the coated article comprises a window.

18. The coated article of claim 13, wherein the layer comprising chromium titanium nitride is characterized by a Cr/Ti ratio of from about 1.0 to 2.75.

19. The coated article of claim 13, wherein the coated article is chemically durable.

20. The coated article of claim 13, wherein the coated article has a visible transmission of from about 10–40%.

21. The coated article of claim 13, wherein the layer system consists essentially of the first and second layers and the layer comprising chromium titanium nitride.

* * * * *